June 7, 1955
K. M. SFORZA DEL PESARO
2,710,067
TWO-STAGE POWER JETS AND INCREASED
FLAME PROPAGATION FOR HELICOPTERS
Filed Feb. 28, 1951
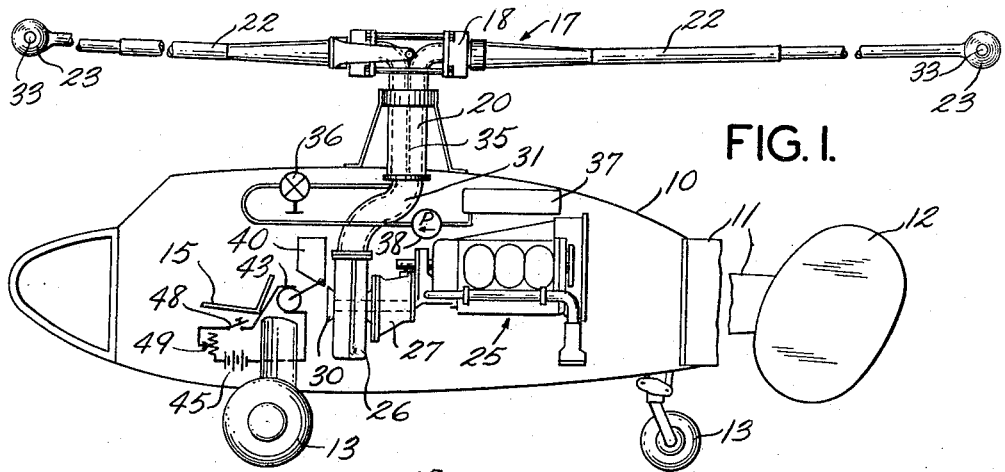
FIG. 1.
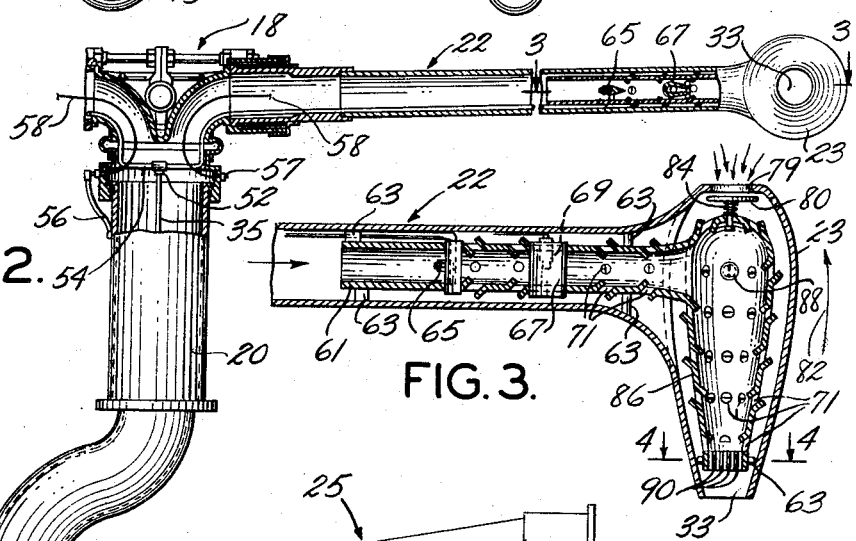
FIG. 2. FIG. 3.
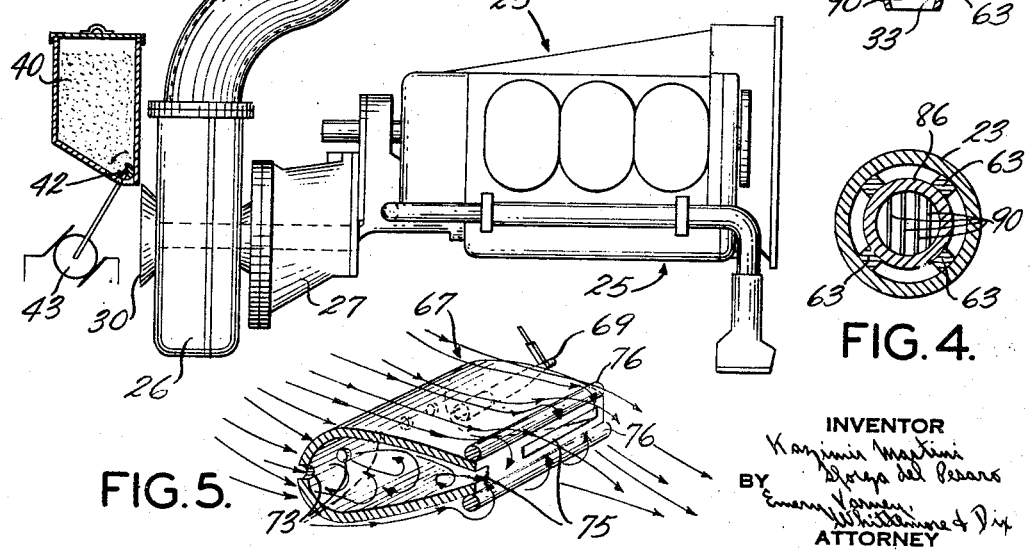
FIG. 4.
FIG. 5.
INVENTOR
Kazimir Martini
Sforza del Pesaro
BY
ATTORNEY United States Patent Office 2,710,067
Patented June 7, 1955

2,710,067

TWO-STAGE POWER JETS AND INCREASED FLAME PROPAGATION FOR HELICOPTERS

Kazimir Martini Sforza del Pesaro, Bronxville, N. Y., assignor to Jet Helicopter Corporation, New York, N. Y., a corporation of Delaware Application February 28, 1951, Serial No. 213,103

10 Claims. (Cl. 170—135.4)

This invention relates to helicopters that have their rotors driven by jets which are discharged from outlets near the tips of the rotor blades, and the invention relates more particularly to constructions for developing at least a part of the jet power by the burning of fuel within the blade structure.

One of the practical difficulties encountered in helicopters, or in aircraft rotors or propellers having fuel burners within them, has been the problem of completing the combustion of the fuel within the length available for combustion chambers, in view of a large velocity of the air in the blades. In order to develop any substantial power it is necessary to use air-fuel streams at high velocity.

It is an object of this invention to provide an improved jet-operated rotor. A more particular object of the invention is to provide means for completing the combustion more quickly in an air-fuel stream within a jet-operated rotor. In spite of the fact that the rate of flame propagation is much smaller than the air velocity in the blade.

Another object of the invention is to provide two-stage jets for operating an aircraft rotor, the term "rotor" being used herein to designate either a propeller or a rotating wing having blades. One feature of the two-stage jet involves the use of air from a compressor for the first stage, and air through the front surface of the blade tip structure for use in the second stage. This makes possible an increase in the fuel burned, and resultant increase in the jet thrust after the rotor acquires a predetermined speed, and without requiring additional air compressor capacity.

In accordance with another feature of the invention, for increasing the rate of flame propagation, oxygen-bearing substances, in powdered or other form, are entrained in the air stream. These substances release oxygen when exposed to the heat of the combustion chamber, and the released oxygen is available to produce a higher rate of flame propagation throughout the combustion space.

Other objects, features and advantages of the invention will appear or be pointed out as the description proceeds.

In the drawing, forming a part hereof, in which like reference characters indicate corresponding parts in all the views, Figure 1 is a diagrammatic elevation of a helicopter made in accordance with this invention, Figure 2 is an enlarged, fragmentary view, partly in section, showing a portion of the apparatus illustrated in Figure 1, Figure 3 is an enlarged sectional view taken on the line 3—3 of Figure 2, Figure 4 is an enlarged sectional view taken on the line 4—4 of Figure 3, Figure 5 is a diagrammatic perspective view through the flame holder for the first stage combustion space shown in Figure 3.

The helicopter comprises a body 10 having a tapered tail 11 and rudder 12. The body has wheels 13 for supporting it on the ground in accordance with usual construction. The pilot occupies a seat 15 while flying the helicopter. He is provided with the usual controls, but they are not illustrated because they are unnecessary for a complete understanding of this invention.

A rotor 17 has a hub 18 connected to a thrust bearing that is rotatable on the upper end of a pylon 20 by which the rotor lifts the helicopter. There are two or more rotor blades 22 extending from the hub 18. At the outer end of each of the blades 22 there is a tip structure 23 for enclosing the combustion chamber for the second stage jet. A combustion chamber for the first stage jet is enclosed within each of the blades inward from the tip structure 23, as will be more fully explained in connection with Figures 2 and 3.

Referring again to Figure 1, the helicopter has an engine, preferably an internal combustion engine 25, connected with a centrifugal blower or compressor 26 through a gear box 27 which preferably drives the blower at a speed greater than the engine speed. The gear ratio in the transmission 27 may be of the order of 1 to 10. This is given by way of illustration only and not in any limiting sense. A gas turbine can be used to drive the blower in place of the engine 24, and when a gas turbine is used a direct drive or small speed ratio transmission can be used between the turbine and the blower.

The blower 26 draws in air through an inlet conduit 30 and delivers the air through an outlet conduit 31 which leads upward through the pylon to branch conduits communicating with the inner ends of the blades 22 at the rotor hub. The blades 22 are hollow throughout their entire length and there is a jet discharge outlet 33 through the rearward end of the tip structure 23. In the preferred construction, the engine 25 has sufficient power to deliver compressed air jets through the rotor blades 22 and out through the jet discharge outlet 33 with sufficient thrust to sustain the helicopter in horizontal flight.

Fuel is supplied to nozzles in the rotor blades 22 through a pipe 35. A manually-operated shutoff valve 36 is located in series with the pipe 35 and in position for convenient operation by the pilot. Fuel, such as gasoline, is delivered from a tank 37 to the valve 36 and pipe 35 by a pump 38.

A dispenser 40 is located along the path of the air stream supplied to the rotor blades. In the construction illustrated, the dispenser 40 is at the intake conduit 30 of the blower 26, but it will be understood that the dispenser can be located at other regions where it can supply powdered or in other form material to the air stream. The dispenser 40 has a hopper bottom and a feeder 42 driven by a motor 43 for supplying an oxygen bearing substance to the air stream at a controlled and uniform rate.

Power can be supplied to the motor 43 from any source within the helicopter, and in the combination illustrated, power is supplied by a storage battery 45. The operation of the motor 43 is controlled by the pilot by means of a shut-off switch 48 and a speed controller 49 located in series with the motor 43. The material in the hopper is an oxygen-carrying substance such as red peroxide of mercury, saltpeter, dioxide of manganese and other high oxides.

These substances are not combustible, and an air stream in which they are entrained is not explosive. However, when exposed to the heat of the jet combustion chambers, these substances release their oxygen, which combines with the jet fuel. This enrichment of the air stream with oxygen increases the rate of flame propagation in the desired degree and makes it possible to burn the jet fuel in a shorter combustion chamber. In order to obtain more uniform distribution of the oxygen-carrying powder in the air stream, the powder which serves as an oxygen-carrier is preferably diluted with a certain amount of other stable neutral powder. The advantage of entraining the powdered oxygen carrier in the air stream before the air stream reaches the rotor is that the dispenser 40 can be of simple construction and located within the helicopter. It is evident that a dispenser small enough to fit on or in the rotor could contain only very limited quantities of powder.

Fig. 2 shows the construction of the rotor hub in section, and also shows the first combustion chamber in section. The hub 18 rotates on bearings at the upper end of the stationary pylon 20, and the fuel supply pipe 35 extends through the upper portion of the pylon along the axis of rotation of the rotor. A swivel joint 52 at the upper end of the pipe 35 turns on the pipe 35 and as a unit with the rotor. Branch pipes 54 lead from the swivel joint 52 to the respective rotor blades.

Electric current for igniters within the rotor blades is supplied from the body of the helicopter through a brush 56 attached to the pylon. This brush 56 bears against a slip ring 57 at the lower end of the rotor hub, and there is wiring 58 through which electric power flows from the slip ring 57 to the igniters in the rotor blades. The actual connections beyond the rotor hub are not illustrated since this part of the construction will be readily apparent to those skilled in the art.

Toward the tip end of the blade 22 there is a first combustion chamber comprising a sleeve 61 which extends lengthwise of the blade 22. This sleeve is preferably made of heat resistant metal and it is spaced from the inside wall of the helicopter blade so as to provide a clearance that prevents excessive transfer of heat from the sleeve 61 to the inside wall of the helicopter blade 22. A portion of the air stream flowing lengthwise along the blade passes between the outside of the sleeve 61 and the blade wall. This air flow assists in preventing excessive heat transfer between the sleeve 61 to the wall of the blade 22; and it also supplies auxiliary air at spaced regions along the length of the combustion chamber as will be more fully explained.

The combustion chamber of sleeve 61 is suported from the wall of the blade 22 by angularly spaced supports 63 located at different regions along the length of the sleeve. These supports are not of sufficient cross section to transmit any substantial amount of heat.

There is a fuel nozzle 65 toward the up stream end of the sleeve 61. This fuel nozzle sprays the fuel against the direction of flow of the air stream to obtain an atomization of the liquid fuel by the blast action of the high velocity air, and to mix the fuel with the air stream as thoroughly as possible. Better mixing of the air and fuel reduces the amount of excess air required for combustion and thus raises the temperature and efficiency of the heated jet. The nozzle 65 is located far enough within the sleeve 61 to prevent fuel from being sprayed beyond the upstream end of the sleeve and into the portion of the air stream that travels into the clearance space between the sleeve 61 and the wall of the blade 22.

Downstream from the nozzle 65 there is a flame holder 67 containing an igniter, such as a spark plug 69. There are auxiliary air inlets 71 opening through the walls of the sleeve 61 at angularly and longitudinally spaced regions of the sleeve 61; and these openings 71 have inwardly extending baffles for agitating and mixing the air stream in the combustion chamber; and have outwardly extending scoops for deflecting into the combustion chamber auxiliary air from the portion of the air stream that flows between the outside of the sleeve 61 and the inside wall of the blade 22.

Figure 5 shows the flame holder 67 in detail, and illustrates its principle of operation. This flame holder has upstream openings 73 through which some of the air-fuel mixture enters the hollow interior of the flame holder 67. The igniter or spark plug 69 easily ignites the air-fuel mixture within the flame holder 67 due to greatly reduced velocity of the air inside the flame holder and the burning mixture leaves the flame holder through slots 75.

There are rods 76 extending along the upper and lower downstream edges of the flame holder 67 for producing a turbulence, and consequent low velocity of the air-fuel stream that passes outside of the flame holder and in the immediate vicinity of the slots 75. This reduced velocity anchors the flame and prevents it from being blown away from the flame holder 67 while the flame propagates itself from the holder across the full cross section of the combustion chamber. The flow of the air-fuel mixture around the flame holder 67, and the way in which the stream eddys around the rods 76 is illustrated by arrows in Fig. 5.

Referring again to Fig. 3, the tip structure 23 has an air inlet 79 through its front face, and there is a valve 80 which closes, by means of a calibrated spring 84, the air inlet 79 until the blade tip acquires a predetermined velocity. The direction of travel of the tip structure 23 is indicated by the arrow 82. The rotor tip speed at which the valve 80 opens depends upon the strength of the spring 84 that surrounds the valve stem and that urges the valve toward closed position.

The tip structure 23 contains the second combustion chamber which comprises a sleeve 86, preferably made of the same material as the sleeve 61 and similarly provided with auxiliary air inlets 71 for introducing into the combustion space during the revolution of rotor progressively larger amounts of air from an annular passage between the sleeve 86 and the wall of the tip structure 23. An outstanding advantage of the auxiliary air inlets 71 is that they permit the air stream to travel at somewhat lower velocity within the upstream portions of the combustion chambers by making it possible to use less air in the combustion chambers during the initial burning of the air-fuel mixture. The auxiliary air that enters the combustion chambers through the inlets 71 serves to complete the combustion while delaying the maximum stream velocity within the combustion spaces until the stream approaches the downstream ends of the combustion chambers.

The first combustion chamber or sleeve 61 opens into the second combustion chamber 86 near the forward end of the chamber 86. There is a spark plug, or other igniter 88, near the upstream end of the second combustion chamber 86.

Close to the downstream end of the second combustion chamber 86 there is a grill comprising slats 90 which are preferably a metal ceramic powder product and which extend across the combustion chamber. These slats 90 become incandescent and serve to ignite any unburned fuel that gets as far as the downstream end of the combustion chamber 86. The maximum distance that any flame has to travel at the grill slats 90 is one-half the spacing of the grill slats from one another. This is because of the fact that the incandescent surfaces of the grill slats ignite any unburned fuel and flames traveling from these incandescent surfaces across one-half the spacing of the grill slats would combine to cover the entire cross section of the combustion chamber.

In the operation of the apparatus, a limited supply of fuel is fed to the nozzle 65 by opening the valve 36 (Fig. 1) by a predetermined amount. Electric current is supplied to the igniter 69 (Fig. 3) and the first stage jet burns in the combustion chamber enclosed by the sleeve 61. Some of the flame may continue into the second stage combustion chamber 86 as the stream travels at high velocity on its way to the jet passage outlet 33.

When the rotor attains sufficient speed, preferably a tip speed of the order of 600 feet per second, the air pressure against the valve 80 is sufficient to open this valve and admit a stream of air into the forward end of the combustion space 86 and into the annular passage between the sleeve 86 and the inside wall of the tip structure 23.

This air supply through the inlet 79 is obtained without any additional compressor capacity, and it makes possible the burning of a much larger quantity of fuel within the rotor, with resulting increase in the jet thrust. In order to take full advantage of this extra air supply, the pilot opens the fuel supply valve wider and the extra fuel mixes with the air stream in the sleeve 61 while the stream travels at high velocity toward the second combustion chamber 86. If the fuel supply is increased to such a point that the air-fuel mixture in the sleeve 61 is too rich to burn, then all of the combustion takes place in the second combustion chamber 86.

This is practical because the second chamber is supplied with air from both the compressor and the inlet 79 for burning the total fuel supply from the nozzle. It is during times when the combustion is confined to the second combustion chamber 86 that the incandescent grill slats 90 are of the greatest importance for insuring complete combustion of the fuel before the jet is discharged from the tip structure 23. The sleeve which encloses the second stage combustion chamber is supported from the tip structure by spacer elements 63 similar to those used for the sleeve 61 in Figure 3.

The cross section of the second combustion chamber 86 is progressively greater, upstream from its discharge end, to the region where it communicates with the sleeve 61. This enlarged cross-section reduces the velocity of the stream and makes possible the combustion of a greater percentage of the air-fuel mixture before it reaches the grill slats 90.

The preferred embodiment of the invention has been illustrated and described, but changes and modifications can be made and some features of the invention can be used alone or in different combinations without departing from the invention as defined in the claims.

I claim as my invention:

1. Apparatus for increasing the speed at which an air-fuel mixture burns while moving at high velocity, said apparatus comprising a combustion chamber through which the mixture passes, a compressor, a conduit through which the compressor supplies a stream of air of high velocity to the combustion chamber, a fuel supply device in position to supply fuel to the compressed air stream near the upstream end of the combustion chamber, an igniter in the combustion chamber down stream from the fuel supply device, a dispenser for containing an oxygen-bearing substance, and a feeder that delivers material from the dispenser to the air stream at a location upstream from the location where fuel is supplied to the air stream.

2. In a helicopter of the class wherein a compressor in the helicopter delivers air through hollow rotor blades and through combustion chambers carried by the rotor blades, at high velocity to jet discharge orifices at the tips of the rotor blades, the combination with said compressor of a fuel supply device in position to supply fuel to the compressed air stream upstream from the combustion chambers, a dispenser in which is stored powder for increasing the rate of flame propagation in the combustion chambers, a discharge outlet from the dispenser to a location near the blower and in the air stream of the blower, and a feeder that feeds powder from the dispenser to the discharge outlet, power means for driving the feeder, and an operator-actuated control that regulates the feeder speed independently of the compressor speed.

3. A jet helicopter including a rotor having hollow blades to which air is supplied from a rotor hub for passage through the hollow blades to a discharge nozzle at the tip end of the blade, a jet engine comprising a tip structure at the outer end of each blade with a sleeve enclosing a combustion chamber therein and having an axis substantially tangent to the direction of rotation of the rotor, the combustion chamber of the jet engine having an air inlet at one side in communication with the hollow blade, and an air inlet at the front end of the combustion chamber for receiving air through an opening in the front end of the tip structure and under a pressure produced by the movement of the jet engine through the air, valve means that close the air inlet opening in the front of the tip structure when the tip speed of the rotor is below a predetermined minimum and an igniter in the combustion chamber, the sleeve that encloses the combustion chamber being made of heat resistant material and spaced from the outer wall of said tip structure to leave air space between the combustion chamber and the outer wall of the tip structure.

4. The combination called for in claim 3 and in which there is a passage through which air from the rotor blade enters into and passes through the space between the sleeve and the outside wall of the tip structure.

5. A jet helicopter including a rotor having hollow blades through which air is supplied from a rotor to jet engines located at the blade tips, each of said jet engines comprising a tip structure and a sleeve within the tip structure inclosing a combustion space with an axis extending substantially tangential to the direction of rotation of the rotor, the combustion space and the tip structure having air inlets at their forward ends on said axis, and at least the air inlet of the tip structure being commanded by a valve, resilient means urging the valve toward closed position but yieldable when the velocity of the wing tip through the air exceeds a predetermined speed, the cross section of the combustion chamber increasing from its air inlet to a predetermined maximum at which the air-fuel stream has its minimum velocity, an igniter for the air-fuel stream, and spaced grids extending across the combustion chamber downstream from the region of maximum cross section of the chamber for substantially completing the combustion of the air-fuel stream before it is discharged from the exhaust of said jet engine.

6. In a jet helicopter having a rotor with hollow blades through which air is discharged from a rotor hub to jet discharge orifices near the blade tips, the combination of a combustion chamber within each blade extending in the same direction as the blade and having within it an igniter and a fuel supply device upstream from the igniter in position to mix fuel with a high velocity air stream supplied from a compressor and through the rotor hub, a second combustion chamber beyond the downstream end of the first combustion chamber and extending with its axis substantially tangential to the direction of rotation of the rotor, a compressor that supplies air through the blade, and an auxiliary air supply comprising a passage opening through a front surface of the rotor near the blade tip and in substantially axial alignment with the second combustion chamber for admitting air to the second combustion chamber, and a valve controlling said passage for auxiliary air supply and the position of which is responsive to rotor tip speed.

7. In a jet helicopter, the combination comprising a rotor having hollow blades through which air flows from a rotor hub, a sleeve enclosing a combustion chamber in each blade extending in the direction of the blade and spaced from the walls of the blade to provide a clearance for the passage of the part of the air stream that passes through the blade, a fuel supply device near the upstream end of the chamber, an igniter in the chamber, passages along the wall of the chamber communicating with the space between the chamber and the rotor wall and through which auxiliary air from that space enters the combustion chamber at spaced regions along the direction of movement of the air stream, a second sleeve enclosing another combustion chamber communicating with the downstream end of the first combustion chamber but having an axis extending substantially tangentially of the direction of rotation of the blade, a second auxiliary air supply comprising a passage communicating with the forward end of the second combustion space, and a valve commanding the passage for said second auxiliary air supply for admitting air into the second combustion space when the rotor is turning in excess of a predetermined speed.

8. In a jet operated helicopter, a rotor having a hub and hollow blades extending from the hub, a jet engine at the tip end of each blade, a combustion chamber in each blade extending in the direction of the blade length and having a wall spaced from the wall of the blade to leave a clearance between the walls of the combustion chamber and the blade for the passage of a portion of an air stream flowing outwardly through the hollow blade, a second combustion chamber in the jet engine and having a wall spaced from the outer wall of the jet engine to provide a space for the passage of air, an air supply duct opening from the atmosphere through the forward end of the jet engine into the second combustion chamber and also into the space between the combustion chamber and the outer wall of the jet engine, both of the combustion chambers being in communication with one another so that an air-fuel stream, well mixed from the first combustion chamber, flows into the second combustion chamber on its way to the discharge orifice at the rearward end of the jet engine.

9. The jet helicopter construction described in claim 8, characterized by an opening between the air space around the first combustion chamber and the air space around the outside of the second combustion chamber so that air pasing through the rotor blade travels successively through the space around both combustion chambers, and air from the air supply opening through the forward end of the jet engine supplements the air flowing from the rotor blade through the space around the outside of the second combustion chamber.

10. A jet operated helicopter including a rotor having hollow blades to which an air stream is supplied through a rotor hub, a tip structure at the end of each blade, a combustion chamber in each blade extending in the direction of the blade length, a fuel supply device in the combustion chamber, an igniter in the combustion chamber, a second combustion chamber located in the tip structure and extending substantially tangentially of the direction of movement of the blade tips and into which the first combustion chamber opens at its downstream end, means that supplies fuel to the fuel supply device, a controller movable into one position to correlate the fuel supply with the air supply to obtain a combustible mixture in the first combustion chamber, and movable into another position to supply an increased amount of fuel that produces a fuel-air mixture having too much fuel for burning in said first combustion chamber, an auxiliary air supply opening through the tip structure and communicating with the second combustion chamber, and an igniter in the second combustion chamber, downstream from the first combustion chamber, for igniting a mixture of the auxiliary air and the rich fuel-air mixture from the first combustion chamber.

References Cited in the file of this patent

UNITED STATES PATENTS

| Number | Name | Date |
|---|---|---|
| 621,884 | Wilson | Mar. 28, 1899 |
| 1,978,518 | Wetherbee | Oct. 30, 1934 |
| 2,330,056 | Howard | Sept. 21, 1943 |
| 2,397,357 | Kundig | Mar. 26, 1946 |
| 2,462,587 | Wilcox | Feb. 22, 1949 |
| 2,465,856 | Emigh | Mar. 29, 1949 |
| 2,540,991 | Price | Feb. 6, 1951 |
| 2,548,804 | McCollum | Apr. 10, 1951 |
| 2,559,814 | Whittle | July 10, 1951 |
| 2,605,608 | Barclay | Aug. 5, 1952 |
| 2,625,795 | Brozozowski | Jan. 20, 1953 |